US008620565B2

(12) United States Patent
Kadolph

(10) Patent No.: US 8,620,565 B2
(45) Date of Patent: Dec. 31, 2013

(54) CONTROL SYSTEM AND METHOD FOR LIMITING ENGINE TORQUE BASED ON ENGINE OIL PRESSURE AND ENGINE OIL TEMPERATURE DATA

(75) Inventor: Stephen L. Kadolph, Westchester, IL (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 1044 days.

(21) Appl. No.: 12/643,764

(22) Filed: Dec. 21, 2009

(65) Prior Publication Data

US 2011/0146622 A1    Jun. 23, 2011

(51) Int. Cl.
*F01L 9/04* (2006.01)
*F01L 1/34* (2006.01)
*F01M 11/10* (2006.01)
*F02M 51/00* (2006.01)

(52) U.S. Cl.
USPC ............ 701/109; 123/90.15; 123/90.16; 123/90.17; 123/90.18; 123/568.16; 701/102; 701/103; 701/104; 73/114.74; 73/114.79

(58) Field of Classification Search
USPC .......... 123/90.11, 90.15, 90.16, 90.18, 196 S, 123/478, 480, 568.16, 679, 690, 27 R, 123/27 GE, 297, 559.1, 564, 196 AB; 701/102, 103, 104, 110, 114; 73/114.74, 114.79; 60/597, 598, 600, 60/601, 602, 605.3, 605.1, 608, 609, 611, 60/280
See application file for complete search history.

(56) References Cited

U.S. PATENT DOCUMENTS

| | | | | |
|---|---|---|---|---|
| 4,421,075 A * | 12/1983 | Mandel | ................. | 123/142.5 R |
| 4,638,782 A * | 1/1987 | Yasuhara et al. | .............. | 123/502 |
| 4,987,871 A * | 1/1991 | Nishikawa | .................... | 123/362 |
| 5,423,302 A * | 6/1995 | Glassey | ....................... | 123/446 |
| 6,067,489 A * | 5/2000 | Letang et al. | ................... | 701/36 |
| 6,148,777 A * | 11/2000 | Motose et al. | .............. | 123/73 C |
| 6,408,618 B2 * | 6/2002 | Ide | .................. | 60/285 |
| 6,692,404 B2 * | 2/2004 | Matsubara et al. | ............... | 477/4 |
| 6,950,739 B2 * | 9/2005 | Matsubara et al. | .......... | 701/103 |
| 7,103,468 B2 * | 9/2006 | Wakashiro et al. | .......... | 701/110 |
| 7,380,983 B2 * | 6/2008 | Bayerle et al. | ............... | 374/144 |
| 7,527,028 B2 * | 5/2009 | Leone | ........................ | 123/90.15 |
| 7,946,263 B2 * | 5/2011 | O'Neill et al. | ............. | 123/90.16 |
| 8,069,829 B2 * | 12/2011 | Leone | ........................ | 123/90.17 |
| 8,181,629 B2 * | 5/2012 | Pursifull et al. | ......... | 123/406.12 |
| 2002/0078681 A1 * | 6/2002 | Carberry et al. | ............... | 60/280 |
| 2003/0233990 A1 * | 12/2003 | Ogawa | ....................... | 123/90.15 |
| 2005/0010353 A1 * | 1/2005 | Matsubara et al. | .......... | 701/103 |
| 2005/0055152 A1 * | 3/2005 | Wakashiro et al. | .......... | 701/110 |
| 2009/0173296 A1 * | 7/2009 | O'Neill et al. | ............. | 123/90.16 |
| 2012/0063927 A1 * | 3/2012 | Murray et al. | ............... | 417/279 |

* cited by examiner

*Primary Examiner* — Stephen K Cronin
*Assistant Examiner* — Raza Najmuddin
(74) *Attorney, Agent, or Firm* — Jeffrey P. Calfa; Mark C. Bach

(57) ABSTRACT

A control system (36) for comparing engine speed data to an engine speed threshold above which the engine is considered to be running (40), for comparing engine temperature data to an engine temperature threshold (60), and once engine speed data has become greater than the engine speed threshold, for causing engine torque to be limited to an engine torque limit until the first to occur of: engine temperature data exceeding the engine temperature threshold, a first timer (44), started upon engine speed data having become greater than the engine speed threshold, having timed to a time that is a function of engine temperature data, and a second timer (54), started upon engine speed data having become greater than the engine speed threshold and engine oil pressure data having become greater than an engine oil pressure threshold, having timed to a time that is also a function of engine temperature data.

21 Claims, 2 Drawing Sheets

CONTROL SYSTEM AND METHOD FOR LIMITING ENGINE TORQUE BASED ON ENGINE OIL PRESSURE AND ENGINE OIL TEMPERATURE DATA

TECHNICAL FIELD

This disclosure relates to internal combustion engines, especially compression ignition (i.e. diesel) engines.

BACKGROUND OF THE DISCLOSURE

When a cold engine is started, its lubricating oil is noticeably more viscous than when the engine is fully warmed. Consequently, the more viscous oil and may not flow as freely through oil passageways in the engine and in associated components such as a turbocharger, as when the engine is fully warmed. A result is reduced oil flow to moving parts such as bearings.

A single-stage wastegate-type turbocharger comprises a wastegate that when open, shunts flow of engine exhaust gas around an associated turbine. When the wastegate is maximally open, exhaust gas energy traveling through the turbine is minimized, thus minimizing the speed at which the turbine wheel spins. A shaft couples the turbine wheel to the compressor wheel of a compressor in the engine intake system. Consequently, when the wastegate is maximally open, the ability of the compressor to create charge air for the engine is limited. The net effect of this is to limit engine torque.

A two-stage wastegate-type turbocharger comprises a high-pressure turbine and a low-pressure turbine in series in the exhaust system. They operate a high-pressure compressor and a low-pressure compressor respectively in the intake system. A respective wastegate shunts each turbine, and it functions in the same way as described above for the single-stage turbocharger.

It is known to provide a time delay that keeps a wastegate open at engine starting and initial miming so that a maximum quantity of exhaust gas by-passes an associated turbine, minimizing the exhaust energy traveling through the associated turbine and thus minimizing the speed that the turbine wheel spins. The delay is based on an assumption that the engine is cold when started in order to limit shaft speed during a time that oil flow to the shaft bearings may be reduced due to the higher viscosity of cold oil.

It is also known to impose the time delay function only when engine oil temperature is below some limit.

SUMMARY OF THE DISCLOSURE

The present disclosure relates to a compression ignition engine comprising engine cylinders within which combustion occurs to operate the engine, an intake system for introducing charge air into the engine cylinders, a fueling system for introducing fuel into the engine cylinders to combust with the charge air, an exhaust system through which exhaust gas resulting from combustion of fuel in the engine cylinders exits, and a turbocharger comprising a turbine through which exhaust gas exiting through the exhaust system passes and a compressor operated by the turbine through which air that has entered the intake system passes to create the charge air. The engine further comprises a control system for comparing engine speed data to an engine speed threshold above which the engine is considered to be running, for comparing engine temperature data to an engine temperature threshold, and once engine speed data has become greater than the speed threshold, for causing engine torque to be limited to an engine torque limit until the first to occur of: engine temperature data exceeding the engine temperature threshold, a first timer having timed to a time that is a function of engine temperature data, and a second timer having timed to a time that is a function of engine oil pressure data.

The present disclosure also relates to a method of limiting engine torque produced by a compression ignition engine that comprises engine cylinders within which combustion occurs to operate the engine, an intake system for introducing charge air into the engine cylinders, a fueling system for introducing fuel into the engine cylinders to combust with the charge air, an exhaust system through which exhaust gas resulting from combustion of fuel in the engine cylinders exits, a turbocharger comprising a turbine through which exhaust gas exiting through the exhaust system passes and a compressor operated by the turbine through which air that has entered the intake system passes to create the charge air, and a control system. The method comprises comparing engine speed data to an engine speed threshold above which the engine is considered to be running, comparing engine temperature data to an engine temperature threshold, and once engine speed data has become greater than the speed threshold, causing engine torque to be limited to an engine torque limit until the first to occur of: engine temperature data exceeding the engine temperature threshold, a first timer having timed to a time that is a function of engine temperature data, and a second timer having timed to a time that is a function of engine oil pressure data.

The foregoing summary, accompanied by further detail of the disclosure, will be presented in the Detailed Description below with reference to the following drawings that are part of this disclosure.

DETAILED DESCRIPTION

Figure 1:
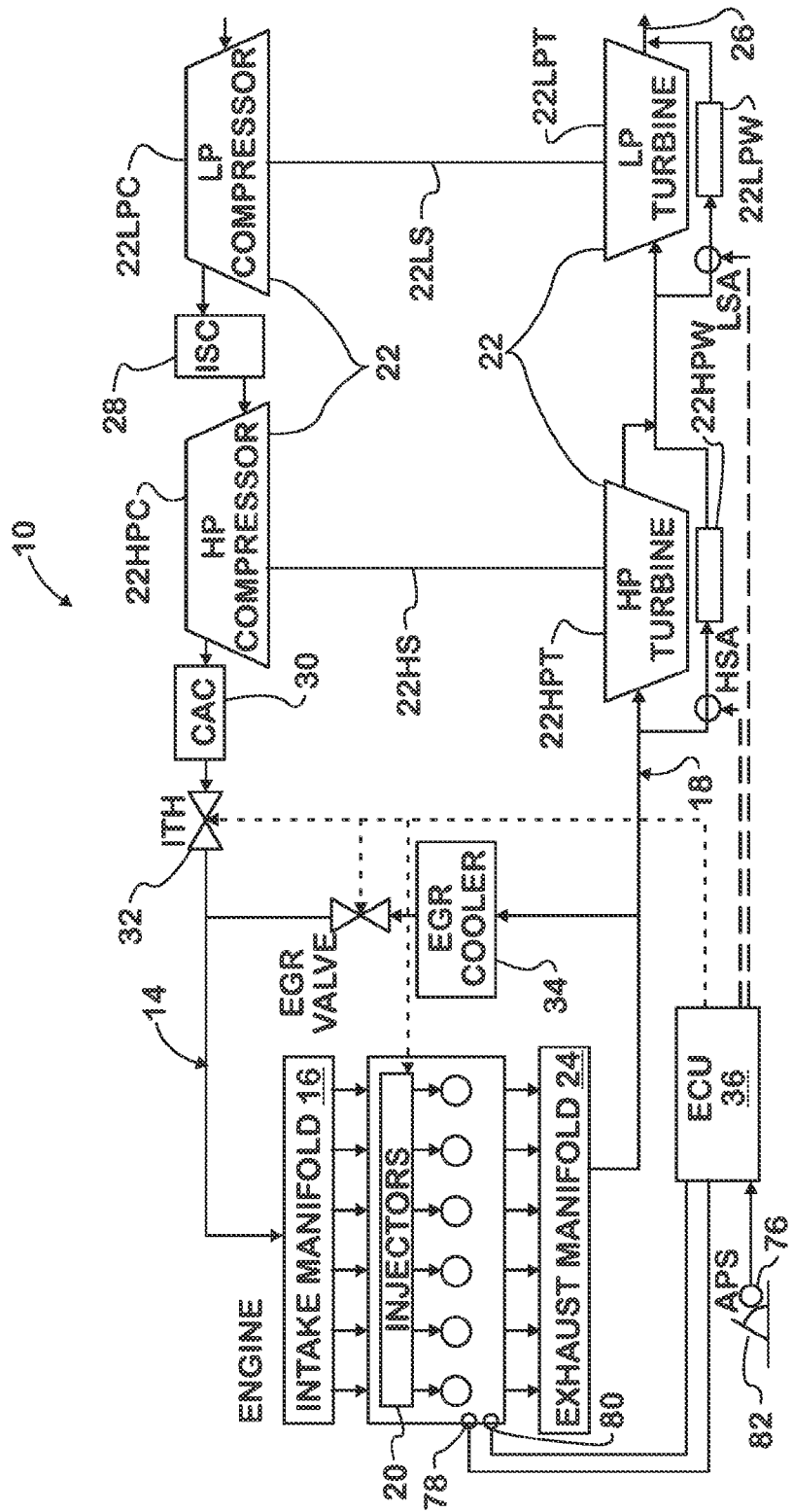
FIG. 1 is a schematic diagram of portions of a diesel engine relevant to the present disclosure.

FIG. 1 shows a diesel engine 10 that comprises engine cylinders 12 within which pistons (not shown) reciprocate. Each piston is coupled to a respective throw of a crankshaft (not shown) by a corresponding connecting rod (not shown). Engine 10 further comprises an intake system 14 for introducing charge air into engine cylinders 12 through an intake manifold 16, an exhaust system 18 through which exhaust gas resulting from combustion of fuel in engine cylinders 12 exits, and a fueling system 20 comprising fuel injectors for introducing fuel into engine cylinders 12 to combust with the charge air.

A turbocharger 22 comprises a high-pressure turbine 22HPT and a low-pressure turbine 22LPT downstream of high-pressure turbine 22HPT through which exhaust gas coming from an exhaust manifold 24 successively passes as the exhaust gas passes through exhaust system 18 to a tailpipe 26. Other devices, an example of which is an after-treatment device, may be present in exhaust system but are not shown.

A wastegate 22HPW shunts high-pressure turbine 22HPT, and a wastegate 22LPW shunts low-pressure turbine 22LPT. When each wastegate is open, it provides a path for at least some of the engine exhaust gas flowing through exhaust system 18 to flow around the associated turbine. When a wastegate is maximally open, exhaust gas energy traveling through the associated turbine is minimized, thus minimizing the speed at which the turbine wheel spins.

Turbocharger 22 further comprises a low-pressure compressor 22LPC operated by low-pressure turbine 22LPT and a high-pressure compressor 22HPC downstream of low-pressure compressor 22LPC in intake system 14 and operated by high-pressure turbine 22HPT. Air that has entered intake system 14 successively passes through low-pressure compressor 22LPC and high-pressure compressor 22HPC to create the charge air that is introduced into engine cylinders 12 via intake manifold 16.

A shaft 22HS couples a turbine wheel of high-pressure turbine 22HPT to a compressor wheel of high-pressure compressor 22HPC, and a shaft 22LS couples a turbine wheel of low-pressure turbine 22LPT to a compressor wheel of low-pressure compressor 22LPC.

When the wastegate of a respective turbine is maximally open, the ability of the respective compressor to create charge air for the engine is limited, in turn limiting engine torque. Increasingly closing a respective wastegate forces more exhaust gas to flow through the respective turbine where energy in the exhaust gas is converted to torque that drives the respective compressor wheel to create greater mass airflow into engine cylinders 12.

FIG. 1 shows additional devices that are typically present in intake system 14. They are an inter-stage cooler 28, a charge air cooler 30, and an intake throttle 32. A high-pressure EGR (exhaust gas recirculation) system 34 is also shown in FIG. 1.

Engine 10 further comprises a processor-based engine control system comprising an ECU (engine control unit) 36 that processes data from various sources to develop various control data for controlling various aspects of engine operation, such as EGR system 34, intake throttle 32, and fueling system 20. The data processed by ECU 36 may originate at external sources, such as various sensors, and/or be generated internally. Examples of data processed may include engine speed, intake manifold pressure, exhaust manifold pressure, fuel injection pressure, fueling quantity and timing, mass airflow, and accelerator pedal position.

Figure 2:
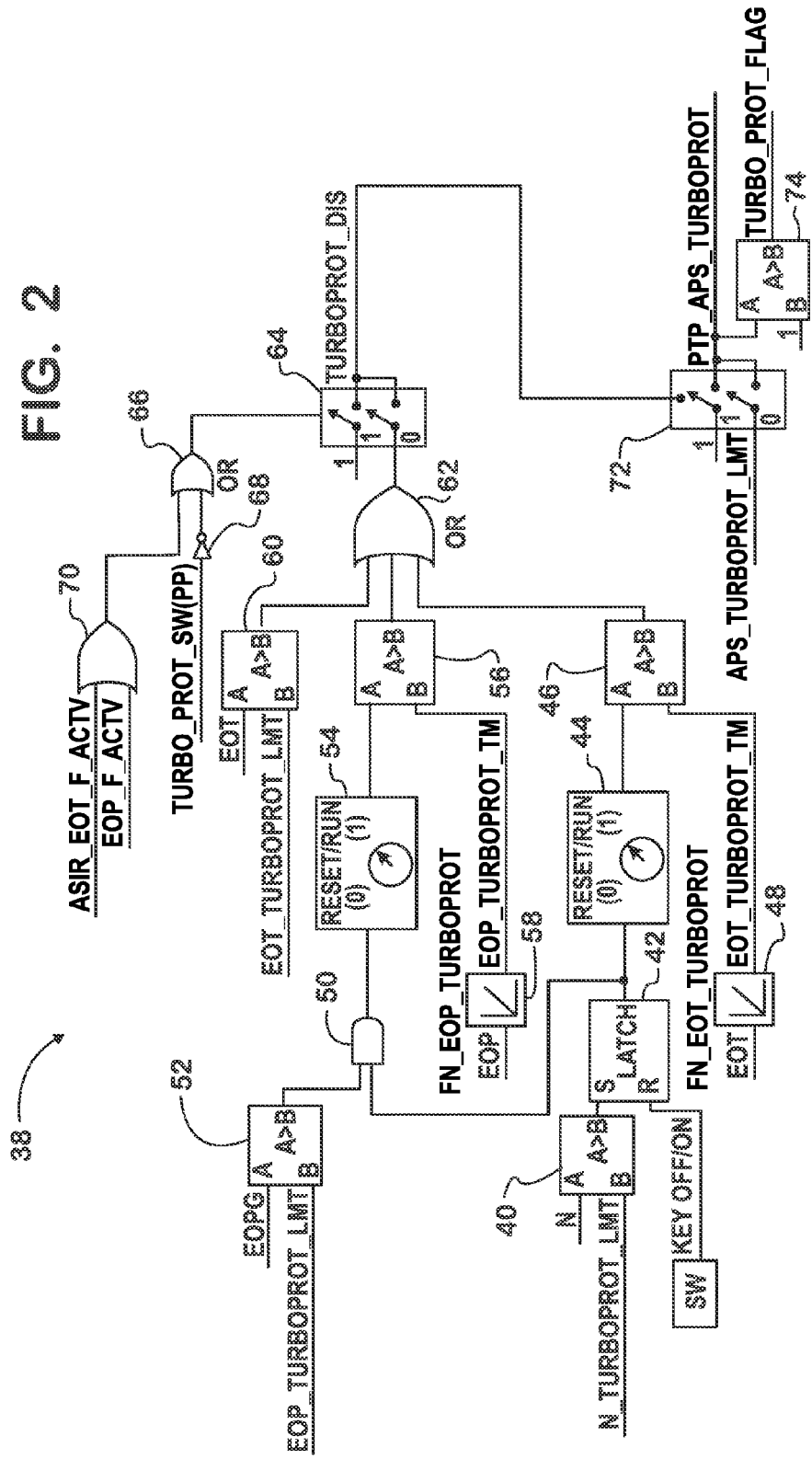
FIG. 2 is a schematic diagram of a strategy that is present in a control system shown in the diagram of FIG. 1.

In accordance with a strategy 38 shown in FIG. 2, engine oil pressure data and engine oil temperature data are also processed by ECU 36 and utilized for control of a solenoid-actuator HSA that sets the extent to which wastegate 22HPW is open and a solenoid-actuator LSA that sets the extent to which wastegate 22LPW is open.

Strategy 38 processes data representing certain variables that include engine speed N, engine oil pressure EOPG, and engine oil temperature EOT.

A compare function 40 compares the data value for engine speed N against a data value for an engine speed threshold N_TURBOPROT_LMT. As long as the data value for engine speed N is equal to or less than the data value for engine speed threshold N_TURBOPROT_LMT, compare function 40 provides a logic "0" output. When the data value for engine speed N is greater than the data value for engine speed threshold N_TURBOPROT_LMT, compare function 40 provides a logic "1" output.

The output of compare function 40 is an input to a set input S of a latch function 42. A logic value for KEY OFF/ON is an input to a reset input R of latch function 42. The logic value for KEY OFF/ON is based on the condition of a switch SW for turning engine 10 on and off, such switch being commonly referred to as an ignition switch.

With engine 10 not running, the data value for engine speed N is less than the data value for engine speed threshold N_TURBOPROT_LMT, causing logic "0" input to latch function 42. When the ignition switch is operated from ON to OFF to turn off engine 10, latch function 42 is reset. The resetting of latch function 42 forces its output to logic "0". If the ignition switch is subsequently operated to crank and start engine 10, latch function 42 will remain reset until engine speed becomes greater than the engine speed threshold N_TURBOPROT_LMT at which time, latch function 42 will become set with its output changing from a "0" to a "1". Once set, latch function 42 cannot be reset until engine 10 is turned off by operation of switch SW to OFF.

When the output of latch function 42 switches from "0" to "1", a timing function (timer) 44 starts. The output of timing function 44 is an input to a compare function 46. Before timing function 44 starts timing, its output is zero. During timing, the data value of its output represents the length of time for which it has been timing.

The other input to compare function 46 is the output of a look-up table, or map, 48 that is named FN_EOT_TURBOPROT. The data value for engine oil temperature EOT is the input to look-up table 48.

Look-up table 48 coordinates data values for a parameter EOT_TURBOPROT_TM with data values for engine oil temperature EOT. EOT_TURBOPROT_TM represents an amount of time, based on engine oil temperature, for which engine torque should be limited after engine starting. In general, the hotter the engine oil temperature, the smaller the value for EOT_TURBOPROT_TM, and consequently the sooner that the time elapsed on timing function 44 will become greater than EOT_TURBOPROT_TM. Hence as engine 10 continues to run and heat its engine oil, a point will be reached where the output of compare function 46 changes from logic "0" to logic "1".

The output of latch function 42 is also one of two inputs to an AND logic function 50. The other input to AND logic function 50 is the output of a compare function 52.

Compare function 52 compares the data value for engine oil pressure EOPG with the data value for a parameter EOP_TURBOPROT_LMT. As long as the data value for engine oil pressure EOPG is equal to or less than the data value for engine oil pressure threshold EOP_TURBOPROT_LMT, compare function 52 provides a logic "0" output. When the data value for engine oil pressure EOPG is greater than the data value for engine oil pressure threshold EOP_TURBOPROT_LMT, compare function 52 provides a logic "1" output.

AND logic function 50 will start a timing function (timer) 54 when its output changes from logic "0" to logic "1". That change occurs when both engine speed is greater than the threshold N_TURBOPROT_LMT and engine oil pressure is greater than the threshold set by EOP_TURBOPROT_LMT. The output of timing function 54 is an input to a compare function 56. Before timing function 54 starts timing, its output is zero. During timing, the data value of its output represents the length of time for which it has been timing.

The other input to compare function 56 is the output of a look-up table, or map, 58 that is named FN_EOP_TURBOPROT. The data value for engine oil temperature EOT is the input to look-up table 58.

Look-up table 58 coordinates data values for a parameter EOP_TURBOPROT_TM with data values for engine oil temperature EOT. EOP_TURBOPROT_TM represents an amount of time, based on engine oil temperature, for which engine torque should be limited after engine starting. In general, the higher the engine oil temperature, the smaller the value for EOP_TURBOPROT_TM, and consequently the sooner that the time elapsed on timing function 54 will become greater than EOP_TURBOPROT_TM. Hence as engine 10 continues to run and engine oil temperature rises, a point will be reached where the output of compare function 56 changes from logic "0" to logic "1".

Engine oil temperature is also one input to a compare function 60. The other input to compare function 60 is the data value for an engine oil temperature threshold EOT_TURBOPROT_LMT. As long as the data value for engine oil temperature EOT is equal to or less than the data value for engine oil temperature threshold EOT_TURBOPROT_LMT, compare function 60 provides a logic "0" output. When the data value for engine oil temperature EOT is greater than the data value for engine oil temperature threshold EOT_TURBOPROT_LMT, compare function 60 provides a logic "1" output.

The outputs of the three compare functions 46, 56, 60 are inputs to an OR logic function 62. The output of OR logic function 62 will be logic "0" only if all three inputs to it are also logic "0". In other words, if the output of any compare function 46, 56, 60 is logic "1", then the output of OR logic function will also be logic "1".

The output of OR logic function 62 is one input to a switch function 64. The other input to switch function 64 is logic "1". Switch function 64 is selectively operable to one or the other of two switch states based on the output of an OR logic function 66. When the output of OR logic function 66 is "0", the output of switch function 64, parameter TURBOPROT_DIS, is the output of OR logic function 62. When the output of OR logic function 66 is "1", parameter TURBOPROT_DIS becomes "1". TURBOPROT_DIS indicates whether strategy 38 is or is not limiting torque by either a "0" or a "1" respectively There are two inputs to OR logic function 66. One is the output of an inverting function 68 whose input is a parameter TURBO_PROT_SW(PP). The other is the output of an OR logic function 70 having a parameter ASIR_EOT_F_ACTV as one input and a parameter EOP_F_ACTV as the other input. When ASIR_EOT_F_ACTV is "1", a fault is indicated in the oil temperature sensor or associated circuitry. When EOP_F_ACTV is "1", a fault is indicated in the oil temperature sensor or associated circuitry.

TURBO_PROT_SW(PP) is a programmable parameter (PP) for selecting whether strategy 38 is or is not allowed to be active. When TURBO_PROT_SW(PP) is "0", the output of OR logic function 66 is forced to "1", not allowing the strategy to limit engine torque. That in turn forces TURBOPROT_DIS to "1".

When TURBO_PROT_SW(PP) is "1", the output of OR logic function 70 can disallow the strategy from limiting torque whenever a fault is indicated in either the oil temperature sensor including associated circuitry or the oil pressure sensor including associated circuitry. This is because a "1" at either input to OR logic function 70 forces the OR logic function output to "1".

TURBOPROT_DIS controls a switch function 72 that is selectively operable to one or the other of two switch states. When TURBOPROT_DIS is "0", the output of switch function 72 identified as PTP_APS_TURBOPROT becomes the input identified as APS_TURBOPROT_LMT. When TURBOPROT_DIS is "1", PTP_APS_TURBOPROT becomes "1" and that indicates that strategy 38 is not limiting engine torque. APS_TURBOPROT_LMT may be a constant or a variable whose value can be determined for a particular engine and vehicle based on engine/turbocharger/vehicle characteristics.

Whenever strategy 38 is limiting torque, the value of PTP_APS_TURBOPROT is typically less than "1" in which case, a compare function 74 sets a flag TURBO_PROT_FLAG to so indicate.

When strategy 38 is limiting torque, the manner in which torque is being limited can be implemented in any or several possible ways. One way is by direct control of turbocharger wastegates that keeps them maximally open or limits the extent to which they are allowed to close. Another way is via a torque control strategy embodied in ECU 36.

An example of such a torque control strategy uses accelerator pedal position as indicated by an accelerator position sensor (APS) 76 shown in FIG. 1. Strategy 38 limits engine torque to a fraction of torque being requested by APS 76. ECU 36 in effect overrides the larger torque request from APS 76 to limit torque to a smaller fractional value. ECU 36 controls torque by appropriate air and fuel management strategies, which when limiting torque, may or may not include controlling turbocharger wastegates. One example of a value for APS_TURBOPROT_LIM may be 10% of the torque requested by APS 76.

Strategy 38 has been shown to compare engine speed data to an engine speed threshold above which the engine is considered to be running, to compare engine temperature data to an engine temperature threshold, and once engine speed data has become greater than the speed threshold, to cause engine torque to be limited to an engine torque limit until the first to occur of: engine temperature data exceeding the engine temperature threshold, timer 44 having timed to a time that is a function of engine temperature data, and timer 54 having timed to a time that is a function of engine temperature data. Timer 44 commences timing once engine speed data becomes greater than the engine speed threshold. Timer 54 commences timing once engine speed data becomes greater than the engine speed threshold and engine oil pressure data becomes greater than the engine oil pressure threshold.

Engine temperature data is sourced from an engine oil temperature sensor 78 and engine oil pressure data is sourced from an engine oil pressure sensor 80. Both sensors are associated with a lubrication system for delivering lubrication under pressure to certain engine components, especially moving parts of such components such as bearings of turbocharger 22. An accelerator pedal 82 for accelerating engine 10 operates APS 76 to issue to ECU 36 a torque request that is a function of accelerator pedal position. When limiting engine torque to the engine torque limit, ECU 36 is effective to limit any torque request from APS 76 that would cause the engine torque limit to be exceeded.

When engine 10 is cranked at starting and begins running under its own power, as indicated by engine speed exceeding the engine speed threshold, an example of which could be 550 revolutions per minute (rpm), strategy 38, if not disallowed by TURBOPROT_DIS, will not limit engine torque if engine temperature is greater than some calibratable engine temperature threshold, an example of which could be 50° F. If engine temperature is not greater than the calibratable engine temperature threshold, timer 44 commences running and will be effective to limit engine torque until it times to a time that is a function of engine temperature. Once it times to that time, timer 44 becomes incapable of limiting engine torque. An example of one calibration point for FN_EOT_TURBOPROT 48 would set a 25 second run time for timer 44 at an engine temperature of −20° F. and a second calibration point would set a 20 second run time at an engine temperature of −10° F. If the oil temperature changes while the timer is running, the time delay function will interpolate between the two points, meaning that for every degree of temperature increase, the time to which the timer times will decrease by one-half second.

If engine temperature is not greater than the calibratable engine temperature threshold, and timer 44 is limiting engine torque, engine oil pressure may nevertheless be effective to cause strategy 38 to cease limiting engine torque. If engine oil pressure becomes greater than the engine oil pressure threshold within a length of time after latch function 42 became set that allows timer 54 to run to a time set by look-up table 58 that causes the output of compare function 56 to switch to a logic "1" while the outputs of compare function 46 and compare function 60 are still "0", then compare function 56 causes strategy 38 to cease limiting engine torque.

What is claimed is:

1. A compression ignition engine comprising:
   engine cylinders within which combustion occurs to operate the engine;
   an intake system for introducing charge air into the engine cylinders;
   a fueling system for introducing fuel into the engine cylinders to combust with the charge air;
   an exhaust system through which exhaust gas resulting from combustion of fuel in the engine cylinders exits;
   a lubrication system for delivering lubrication under pressure to certain engine components;
   a control system for comparing engine speed data representing engine speed to an engine speed threshold above which the engine is considered to be running, for comparing engine temperature data representing temperature of the engine to an engine temperature threshold, for starting a first timer once engine speed data has become greater than the engine speed threshold, for starting a second timer once engine speed data has become greater than the engine speed threshold and engine oil pressure data representing pressure of lubrication in the lubrication system has become greater than an engine oil pressure threshold, and for causing engine torque to be limited to an engine torque limit until the first to occur of: engine temperature data exceeding the engine temperature threshold, the first timer having timed to a time that is a function of engine temperature, and the second timer having timed to a time that is a function of engine temperature, wherein the control system comprises a latch function that is selectively operable to a set state and a reset state and that is operated from the reset state to the set state when engine speed data becomes greater than the engine speed threshold, and the first timer commences timing when the latch function is operated from the reset state to the set state.

2. A compression ignition engine as set forth in claim 1 in which engine temperature data is sourced from an engine oil temperature sensor and engine oil pressure data is sourced from an engine oil pressure sensor.

3. A compression ignition engine as set forth in claim 2 further comprising an accelerator pedal that is operated to accelerate the engine and an accelerator position sensor operated by the accelerator pedal for issuing to the control system a torque request that is a function of accelerator pedal position, and in which the control system, when limiting engine torque, is effective to limit any torque request from the accelerator position sensor that would cause the engine torque limit to be exceeded.

4. A compression ignition engine as set forth in claim 3 in which the control system conjunctively acts on both the intake system and the fueling system to limit both charge air and fueling when limiting engine torque.

5. A compression ignition engine as set forth in claim 1 in which the control system comprises a compare function for comparing the engine oil pressure data to the engine oil pressure threshold, and in which the second timer commences timing upon concurrence of the latch function being in the set state and the compare function disclosing that the engine oil pressure data has become greater than the engine oil pressure threshold.

6. A compression ignition engine as set forth in claim 5 in which the latch function is operated from the set state to the reset state when the engine is turned off.

7. A compression ignition engine as set forth in claim 1 in which the control system comprises a first look-up table from which the engine temperature data selects the time that is a function of engine temperature to which the first timer times, and a second look-up table from which the engine temperature data selects the time that is a function of engine temperature to which the second timer times.

8. A compression ignition engine as set forth in claim 1 in which the control system comprises an input for selectively allowing and disallowing engine torque to be limited to the engine torque limit.

9. A compression ignition engine as set forth in claim 1 in which the control system comprises a first fault input for disallowing engine torque to be limited to the engine torque limit when engine temperature data is indicated to be potentially faulty, and a second fault input for disallowing engine torque to be limited to the engine torque limit when engine oil pressure data is indicated to be potentially faulty.

10. A compression ignition engine as set forth in claim 1 in which an engine component to which the lubrication system delivers lubrication under pressure comprises a turbocharger comprising a turbine through which exhaust gas exiting through the exhaust system passes and a compressor operated by the turbine through which air that has entered the intake system passes to create the charge air.

11. A compression ignition engine as set forth in claim 1 in which the control system ceases causing engine torque to be limited to the engine torque limit upon the first to occur of: engine temperature data exceeding the engine temperature threshold, the first timer having timed to a time that is a function of engine temperature, and the second timer having timed to a time that is a function of engine temperature.

12. A method of limiting engine torque produced by a compression ignition engine that comprises engine cylinders within which combustion occurs to operate the engine; an intake system for introducing charge air into the engine cylinders; a fueling system for introducing fuel into the engine cylinders to combust with the charge air; an exhaust system through which exhaust gas resulting from combustion of fuel in the engine cylinders exits; a lubrication system for delivering lubrication under pressure to certain engine components; and a control system, the method comprising:
   comparing engine speed data representing engine speed to an engine speed threshold above which the engine is considered to be running, comparing engine temperature data representing engine temperature to an engine temperature threshold, starting a first timer once engine speed data has become greater than the engine speed threshold, starting a second timer once engine speed data has become greater than the engine speed threshold and engine oil pressure data representing pressure of lubrication in the lubrication system has become greater than an engine oil pressure threshold, and causing engine torque to be limited to an engine torque limit until the first to occur of: engine temperature data exceeding the engine temperature threshold, the first timer having timed to a time that is a function of engine temperature, and the second timer having timed to a time that is a function of engine temperature, operating a latch function from a reset state to a set state when engine speed data becomes greater than the engine speed threshold, and starting the first timer when the latch function is operated from the reset state to the set state.

13. A method as set forth in claim 12 comprising sourcing engine temperature data from an engine oil temperature sensor and sourcing engine oil pressure data from an engine oil pressure sensor.

14. A method as set forth in claim 13 further comprising operating an accelerator pedal to accelerate the engine, issuing a torque request that is a function of accelerator pedal position from an accelerator position sensor operated by the accelerator pedal, and limiting engine torque by limiting any torque request from the accelerator position sensor that would cause the engine torque limit to be exceeded.

15. A method as set forth in claim 14 comprising conjunctively acting on both the intake system and the fueling system to limit both charge air and fueling when limiting engine torque.

16. A method as set forth in claim 12 comprising comparing engine oil pressure data to an engine oil pressure threshold, and starting the second timer upon concurrence of the latch function being in the set state and the engine oil pressure data becoming greater than the engine oil pressure threshold.

17. A method as set forth in claim 16 comprising operating the latch function from the set state to the reset state when the engine is turned off.

18. A method as set forth in claim 12 comprising using engine temperature data to select from a first look-up table the time that is a function of engine temperature to which the first timer times, and using engine oil pressure data to select from a second look-up table the time that is a function of engine temperature to which the second timer times.

19. A method as set forth in claim 12 comprising selectively allowing and disallowing engine torque to be limited to the engine torque limit.

20. A method as set forth in claim 12 comprising disallowing engine torque to be limited to the engine torque limit when engine temperature data is indicated to be potentially faulty, and disallowing engine torque to be limited to the engine torque limit when engine oil pressure data is indicated to be potentially faulty.

21. A method as set forth in claim 12 comprising causing engine torque to cease being limited to an engine torque limit upon the first to occur of: engine temperature data exceeding the engine temperature threshold, the first timer having timed to a time that is a function of engine temperature, and the second timer having timed to a time that is a function of engine temperature.

* * * * *